United States Patent [19]

Blum et al.

[11] Patent Number: 6,084,051

[45] Date of Patent: Jul. 4, 2000

[54] HIGH SOLIDS POLYURETHANE-UREA DISPERSIONS HAVING IMPROVED STORAGE STABILITY

[75] Inventors: Harald Blum, Leverkusen; Wieland Hovestadt, Leichlingen, both of Germany; Lothar Kahl, FRACC Atizapan de Zaragoza, Mexico; Douglas A. Wicks, Pittsburgh, Pa.

[73] Assignees: Bayer Aktiengesellschaft, Leverkusen, Germany; Bayer Corporation, Pittsburgh, Pa.

[21] Appl. No.: 09/318,356

[22] Filed: May 25, 1999

[30] Foreign Application Priority Data

Jun. 2, 1998 [DE] Germany ............................ 198 24 484

[51] Int. Cl.$^7$ .................................................... C08G 18/12
[52] U.S. Cl. ............................................. 528/71; 524/840
[58] Field of Search ................................ 524/840; 528/71

[56] References Cited

U.S. PATENT DOCUMENTS

| | | | |
|---|---|---|---|
| 5,025,064 | 6/1991 | Reiff et al. | 524/591 |
| 5,342,915 | 8/1994 | Licht et al. | 528/71 |
| 5,922,806 | 7/1999 | Blum et al. | 524/591 |

FOREIGN PATENT DOCUMENTS

91/17196 11/1991 WIPO.

OTHER PUBLICATIONS

Houben–Weyl Methoden der organischen Chemie, vol. E 20, (month unavailable) 1987 p. 1659.
Advance in Urethane Science and Tech., vol. 10, (month unavailable) pp. 121–162, 1986.
Ullmanns Encyclopedia of Industrial Chem. vol. A 21, (month unavailable) 1992, p. 677.

*Primary Examiner*—Rachel Gorr
*Attorney, Agent, or Firm*—Joseph C. Gil; Thomas W. Roy

[57] ABSTRACT

The present invention relates to aqueous polyurethane-urea dispersions having a resin solids content of at least 35 wt. % and a pH of at least 7.5 which are prepared by a) forming an isocyanate-terminated prepolymer by reacting a difunctional polyol having a molecular weight of 500 to 6000, a low molecular weight alcohol, a diisocyanate and/or triisocyanate and an isocyanate-reactive compound which has an acid group, b) neutralizing 65% to 95% of the acid groups prior to dispersing the prepolymer in water, c) dispersing the neutralized prepolymer in water, d) chain extending the isocyanate groups with water to form a polyurethane-urea, and e) after completion of the chain extending reaction adding additional neutralizing agent to provide a total amount of neutralizing agent that is sufficient to neutralize at least 115% of the acid groups of component D), wherein the polyurethane-urea contains 1.0 to 4.0%, based on resin solids, of the isolated urea groups. The present invention also relates to a process for the preparation of these polyurethane-urea dispersions and to their use in coating compositions.

11 Claims, No Drawings

HIGH SOLIDS POLYURETHANE-UREA DISPERSIONS HAVING IMPROVED STORAGE STABILITY

BACKGROUND OF THE INVENTION

1. Field of the Invention

The present invention relates to high solids polyurethane-urea dispersions, to a process for their preparation and to their use in lacquers and coating compositions.

2. Description of the Prior Art

Aqueous binders based on hydrophilically modified polyurethanes or polyurethane-polyureas are known as described, e.g., in Houben-Weyl, Methoden der organischen Chemie, Vol. E 20, p. 1659 (1987), "Advances in Urethane Science and Technology", Vol. 10, p. 121–162 (1987), Ullmann's Encyclopedia of Industrial Chemistry, Vol. A 21, p. 677 (1992).

The known aqueous dispersions generally result in coating compositions having a very good properties, which, depending upon the composition, are suitable for a very wide variety of applications. The spectrum ranges from hard, abrasion resistant coatings, which may be used for coating floors, to soft, highly elastic coatings, which are suitable for coating textiles.

Although the prior art includes a large number of various types of polyurethane dispersions, even better polyurethanes and polyurethane-polyureas are required. There is a need for the dispersions to have high molecular weights, to have solids contents of at least 40% at low viscosity, despite a high ionic group content, and to be storage even in highly diluted form.

The high contents of ionic groups are necessary to increase the stability of the dispersions or the formulated coatings compositions based on these dispersions and guarantee optimum pigment wetting, so that the resulting coatings have very good optical properties. However, in dispersions of high molecular weight polymers, high ionic group contents generally lead to very low solids contents. High molecular weights are indispensable in applications in which no or only a slight chemical crosslinking reaction takes place after application and good stability properties are nevertheless required. In some fields of application, such as in metallic basecoats or in wood varnishes, dispersions are frequently used in highly diluted form. Good stability must be ensured even in such high dilutions.

An object of the present invention is to provide polyurethane-urea dispersions which, in addition to good stability, also dry rapidly, have a minimum film-forming temperature <0° C. without the addition of organic solvents, and have very good cleanability (i.e., dried-on polyurethane films or polymer residues or lacquer overspray from application installations or application tools can be removed).

This object may be achieved with the polyurethane-urea dispersions according to the present invention, which are described hereinafter.

SUMMARY OF THE INVENTION

The present invention relates to aqueous polyurethane-urea dispersions having a resin solids content of at least 35 wt. % and a pH of at least 7.5 which are prepared by a) forming an isocyanate-terminated prepolymer by reacting
   A) a difunctional polyol having a number average molecular weight of 500 to 6000,
   B) an at least difunctional low molecular weight alcohol having a number average molecular weight of less than 500,
   C) a diisocyanate and/or triisocyanate, and
   D) a compound which has an acid group and one or two isocyanate-reactive groups comprising a member selected from the group consisting of hydroxy, primary amino and secondary amino groups, and which is present in an amount sufficient to provide an acid number, based on resin solids, of 12 to 27 mg of KOH/g, b) neutralizing 65% to 95% of the acid groups of component D) prior to dispersing the prepolymer in water, c) dispersing the neutralized prepolymer in water, d) chain extending the isocyanate groups with water to form a polyurethane-urea, and e) after completion of the chain extending reaction adding additional neutralizing agent to provide a total amount of neutralizing agent that is sufficient to neutralize at least 115% of the acid groups of component D), wherein the polyurethane-urea contains 1.0 to 4.0%, based on resin solids, of the isolated urea groups shown in square brackets in formula (I)

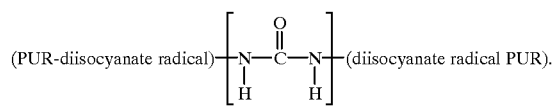

The present invention also relates to a process for the preparation of these polyurethane-urea dispersions by a) preparing an acid-functional, isocyanate-terminated polyurethane prepolymer from components A), B), C) and D), optionally in organic solution, b) neutralizing 65 to 95% of the acid groups with a neutralizing agent, c) dispersing the prepolymer in water, d) chain extending the prepolymer with water and e) after completion of chain extension, adding sufficient neutralizing agent to neutralize at least 115% of the acid groups.

Finally, the present invention relates to coating compositions containing the polyurethane-urea dispersions according to the invention.

DETAILED DESCRIPTION OF THE INVENTION

Suitable components A) include polymers having at least two isocyanate-reactive groups, preferably hydroxyl groups, and a number average molecular weight of 500 to 6000, such as polyesters, polyethers, polyether polyamines, polycarbonates and polyester amides.

The dihydroxy polyesters are preferably prepared from dicarboxylic acids or their anhydrides and diols. Examples of suitable acids and anhydrides include adipic acid, succinic acid, phthalic acid anhydride, isophthalic acid, terephthalic acid, suberic acid, azelaic acid, sebacic acid, tetrahydrophthalic acid, maleic acid anhydride and dimeric fatty acids. Examples of diols include ethylene glycol, propylene glycol, 1,3-propanediol, diethylene glycol, triethylene glycol, 1,4-butanediol, 1,6-hexanediol, trimethylpentanediol, 1,4-cyclohexanediol, 1,4-cyclohexanedi-methanol, neopentyl glycol and 1,8-octanediol.

It is also possible to prepare the polyesters that contain small amounts (i.e., 0.01 to 10 wt. %) of mono-, tri- or tetra-functional raw materials, such as 2-ethylhexanoic acid, benzoic acid, soybean oil fatty acid, oleic acid, stearic fatty acid, sunflower oil fatty acid, trimellitic acid anhydride, trimethylolpropane, glycerol and pentaerythritol.

It is also possible to use polyesters prepared from lactones, especially E-caprolactone; polycarbonates, which may be obtained by reacting the previously described diols with diaryl or dialkyl carbonates or phosgene; and castor oil as component A).

Suitable polyethers include those obtained by the polymerization of propylene oxide and/or tetrahydrofuran, and optionally minor amounts of ethylene oxide and/or styrene oxide onto suitable starter molecules such as diols, triols, water and amines.

Component A) is preferably selected from difunctional polyesters or polycarbonates having a molecular weight of 840 to 2600.

Component B) is selected from at least difunctional low molecular weight alcohols having a number average molecular weight of less than 500, preferably less than 350. Examples of compounds suitable for use as component B) include ethylene glycol, 1,4-butanediol, 1,6-hexanediol, neopentyl glycol, trimethylolpropane, glycerol, trimethylpentanediol, propylene glycol, 1,3-propanediol, 1,4-cyclohexadimethanol and mixtures thereof. Preferred are mixtures of a difunctional alcohol (such as neopentyl glycol, 1,4-butanediol, 1,6-hexanediol or ethylene glycol) with a trifunctional alcohol (such as trimethylolpropane or glycerol).

Suitable components C) include (cyclo)aliphatic diisocyanates and triisocyanates, preferably diisocyanates, such as hexamethylene diisocyanate, butane diisocyanate, isophorone diisocyanate, 1-methyl-2,4-and/or -2,6-diisocyanato-cyclohexane, norbornane diisocyanate, tetramethylxylylene diisocyanate, hexahydroxylylene diisocyanate, nonane triisocyanate and 4,4'-diisocyanatodicyclohexylmethane. It is also possible to use aromatic isocyanates, such as 2,4- and/or 2,6-diisocyanatotoluene or 4,4'-diisocyanato-diphenylmethane. Also suitable are higher molecular weight or oligomeric polyisocyanates having a molecular weight of 336 to 1500, which are prepared from the preceding monomeric (cyclo)aliphatic isocyanates.

Preferred diisocyanates are 4,4'-diisocyanatodicyclohexylmethane, isophorone diisocyanate, hexamethylene diisocyanate, 1-methyl-2,4-and/or -2,6-diisocyanatocyclohexane and mixtures thereof.

Component D) is selected from compounds having at least one acid group, preferably a carboxylic acid group, and at least one, preferably one or two, isocyanate-reactive groups selected from hydroxyl, primary amino and secondary amino groups. Examples of preferred compounds include 2,2-bis(hydroxymethyl)alkanecarboxylic acids, such as dimethylolacetic acid, 2,2-dimethylolpropionic acid, 2,2-dimethylolbutyric acid and 2,2-dimethylolpentanoic acid; dihydroxysuccinic acid; hydroxypivalic acid; and mixtures thereof. Especially preferred are dimethylolpropionic acid and/or hydroxypivalic acid.

Also suitable as component D) are sulfonic acid diols optionally containing ether groups, such as those described in U.S. Pat. No. 4,108,814. The free acid groups are also referred to as "potential ionic" groups, while the salt-like groups, preferably carboxylate groups, obtained after neutralization with neutralizing groups are "ionic" groups.

Component D) is used in an amount sufficient to provide an acid number, based on resin solids, of 12 to 27, preferably 15 to 25, mg of KOH/g. Lower acid values result in dispersions having inadequate storage stability and/or cleanability, while higher acid values, after neutralization, result in dispersions having very low solids contents and result in lacquers and coatings that have inadequate water resistance.

In addition to the structural components A), B), C) and D), component E) may also be used in small amounts to prepare the polyurethane-urea dispersion. Component E) is selected from non-ionic hydrophilic polyethers containing one or two isocyanate-reactive groups, preferably hydroxyl groups. At least 70% of the polyether chains of these compounds contain ethylene oxide units. Examples of suitable hydrophilic polyethers include mono- or di-functional polyethylene glycol monoalkyl ethers having number average molecular weights of 350 to 2500.

Preferred water-dispersible polyurethanes according to the invention are reaction products of A) 45 to 75 wt. %, preferably 50 to 70 wt. %, of one or more at least difunctional polyols having a number average molecular weight of 500 to 6000, preferably one or more difunctional polyesters and/or polycarbonates having a number average molecular weight of 840 to 2600, B) 1 to 6 wt. %, preferably 1 to 4 wt. %, of one or more at least difunctional alcohols having a number average molecular weight of less than 500, preferably less than 350, and more preferably a mixture of a difunctional and a trifunctional alcohol having a number average molecular weight less than 210, C) 20 to 45 wt. %, preferably 25 to 40 wt. %, of one or more diisocyanates and/or triisocyanates, preferably isophorone diisocyanate, hexamethylene diisocyanate and/or 4,4-diisocyanato-dicyclohexylmethane, D) 3 to 7 wt. %, preferably 4 to 6 wt. %, of dimethylolpropionic acid, dimethylolbutyric acid and/or hydroxypivalic acid, preferably dimethylolpropionic acid and/ or hydroxypivalic acid, and E) 0 to 5 wt. % of a non-ionic/hydrophilic, monofunctional polyethylene glycol monoalkyl ether having a number average molecular weight of 350 to 2500.

The reaction of components A), B), D) and, optionally, E) with the isocyanate-functional component C) is carried out in known manner in one or several steps. The amounts of the reactants are selected such that the NCO:OH equivalent ratio is 1.25:1 to 2.2:1, preferably 1.4:1 to 1.7:1. The reaction may be carried out with the addition of small amounts of catalysts, such as dibutyltin dilaurate, tin 2-octoate, dibutyltin oxide or diazabicyclononane.

In order to avoid problems with viscosity, stirring, mixing and removing heat, the reaction is preferably carried out in a 45 to 95 wt. % organic solution, especially in a 50 to 80 wt. % acetone solution.

Prior to dispersing the NCO-functional polyurethane polymer in water, sufficient neutralizing agent to neutralize 65 to 95%, preferably 75 to 95%, of the acid groups is added. Suitable neutralizing agents include triethylamine, N-methylmorpholine, dimethylisopropylamine, potassium hydroxide or sodium hydroxide.

After dispersion of the polyurethane prepolymer in water, stirring is carried out until all of the NCO groups have reacted (chain extended) with water. Subsequently, an additional amount of the neutralizing agent is added that is sufficient to neutralize at least 115%, preferably >150% and more preferably >165%, of the acid groups initially incorporated. Suitable neutralizing agents for this step include those previously mentioned and also dimethylethanolamine, ammonia, morpholine, methyldiethanolamine, aminomethylpropanol, triethanolamine and ethanolamine.

The dispersions preferably contain mixtures of different neutralizing agents, such as triethylamine or dimethylisopropylamine mixed with dimethylethanolamine or aminomethylpropanol. Especially advantageous application and drying properties can be obtained due to the different water miscibilities and vapor pressures of the various neutralizing agents in the dispersion.

Some or, preferably, all of the solvents used to prepare the polyurethane prepolymer may be separated from the dispersion by distillation. Preferably, the dispersions according to the invention do not contain organic solvents. The distillation is preferably carried out such that none of the neutralizing agent is distilled off at the same time. Any neutralizing agent that is distilled off is subsequently replaced by the addition of a corresponding amount of neutralizing agent to the dispersion.

To chain extend the NCO-functional polyurethane prepolymer in water, up to 40% of the NCO groups may be reacted with known mono-, di- or tri-functional amino chain extending or chain terminating agents. These agent may also contain ionic groups, acid groups or hydroxyl groups. Preferably, however, chain extension is carried out solely with water.

The dispersions according to the invention contain isolated urea groups in an amount of 1.0 to 4.0 wt. %, preferably 1.75 to 3.25 wt. %, based on resin solids. The amount of urea groups can be calculated based on the isocyanate group content of the prepolymer. The urea groups are shown in formula (I) in square brackets:

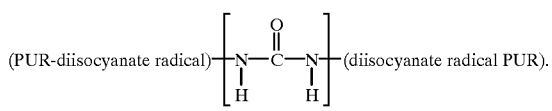

The calculation proceeds on the assumption that half of the NCO groups in the polyurethane prepolymer react with water to form $CO_2$ and amino groups, which then react with the other half of the NCO groups to form monourea groups and increase the molecular weight.

Higher concentrations of urea groups, which are shown in formula (II) in square brackets, are preferably not contained in the dispersions according to the invention:

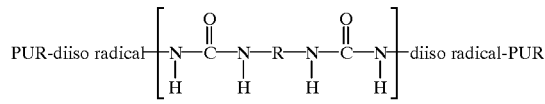

wherein

R represents a hydrocarbon radical, for example, a low molecular weight diamine having 2 to 10 carbon atoms.

The dispersions according to the invention have particle diameters (determined, for example, by means of LKS measurements) of 20 to 600, preferably 50 to 150 nm.

The solids content of the dispersions at viscosities that correspond to flow out times of 10 to 100 seconds (DIN 4 beaker, 23° C.) is at least 35%, preferably at least 40%. The pH of the dispersion is at least 7.5, preferably at least 8.5. The weight average molecular weight ($M_w$, determined by gel permeation chromatography) of the dispersions are >25,000, preferably >50,000.

The products according to the invention are suitable for coating any substrates, preferably wood, ceramics, stone, concrete, bitumen, hard fibers, glass, porcelain and a very wide variety of plastics. They may also be used as a finish or dressing for textile and leather coatings. Especially preferred fields of use are those in which good pigment wetting, suitable rheological behavior, high molecular weight, viscosity and storage stability even in dilute solution, and good cleanability of the equipment and installations used, are important. Examples of these include automotive repair and automotive series coating, especially with single color or metallic basecoats.

The dispersions may be mixed with other ionic or non-ionic dispersions, for example, polyvinyl acetate, polyethylene, polystyrene, polybutadiene, polyurethane, polyvinyl chloride, polyacrylate and copolymer-plastics dispersions. The addition of known external (i.e., not chemically incorporated) emulsifiers, preferably ionic emulsifiers is also possible.

The coating compositions containing the dispersions according to the invention may also contain other known additives. These include wetting agents (such as carbodiimides), polyisocyanates, blocked polyisocyanates, partially or wholly etherified melamine resins, pigments, metallic pigments based on aluminum flakes, fillers (such as carbon black, silica, talcum and kaolin), titanium dioxide, glass powder, glass fibers, cellulose, cellulose acetobutyrate, flow aids, stabilizers for improving weather resistance, thickeners and anti-settling agents.

Processing of the dispersion to produce coatings may be carried out according to various methods, such as brushing, pouring, spraying, immersing, rolling and knife application.

Drying of the products obtained by various application techniques may be carried out at room temperature or at elevated temperature up to 200° C., preferably 60 to 150° C.

The invention is further illustrated but is not intended to be limited by the following examples.

EXAMPLES

In the examples all parts and percentages are by weight. The molecular weights of the polymer diol components are number average molecular weights.

Example 1

1340 g of a polycarbonate diol (molecular weight 2000, based on hexanediol/ε-caprolactone), 900 g of a polyester diol (molecular weight 2000, based on adipic acid/neopentyl glycol), 180 g of dimethylolpropionic acid, 31.7 g of 1,4-butanediol and 62.2 g of trimethylolpropane were weighed into a 10 liter reaction vessel having a stirrer, cooler and heating device. The mixture was dissolved in 1700 g of acetone and then reacted with 1018 g of isophorone diisocyanate and 177 g of 4,4'-dicyclo-hexylmethane hexylmethane diisocyanate at reflux temperature until the theoretical NCO content was obtained. 121 g of triethylamine and 5200 g of water were then added and the mixture was stirred at 50° C. until no more NCO groups were detected. 121 g of triethylamine were then added and acetone was distilled off. A low-viscosity 42% dispersion 1) was obtained which had a pH of 9.6. The amount of neutralizing agent, based on the amount of carboxyl groups incorporated, was 89% before dispersion and 178% in the finished dispersion. The acid number, based on resin solids, was approximately 20 mg of KOH/g. The content of isolated urea groups was 2.7%, based on resin solids.

Comparison Example 2

Example 1 was repeated with the exception that the entire amount of 242 g of neutralizing agent (which corresponded to an amount of 178%, based on the carboxyl groups) was added prior to dispersion. When chain extension was complete, the acetone was separated off by distillation. In order for dispersion 2) to have the same viscosity as dispersion 1), it was necessary to add water in an amount such that the solids content of the dispersion 2) fell to 30%.

Example 3

2240 g of a polyester diol (molecular weight 2000, based on adipic acid/hexanediol/neopentyl glycol, molar ratio of diol 65:35), 43.2 g of butanediol, 180 g of dimethylolpropionic acid and 62.2 g of tri-methylolpropane were weighed into a 10 liter reaction vessel having a stirrer, cooler and heating device. The mixture was dissolved in 1300 g of acetone and then reacted with 1261 g of isophorone diisocyanate until the theoretical NCO content was obtained. 113 g of triethylamine and 4650 g of distilled water were then added and the mixture was stirred at 50° C. until no more NCO groups were detected. 122.5 g of dimethylethanolamine were then added and the acetone was distilled off. A 45% dispersion 3) was obtained, which had a pH of 9.6. The total amount of neutralizing agent, based on the amount of carboxyl groups, was 186%. The acid number, based on resin solids, was approximately 20 mg of KOH/g. The amount of isolated urea groups was 3.1%, based on resin solids.

Example 4

800 g of a polyester diol (molecular weight 2000, based on phthalic acid anhydride/hexanediol), 1224 g of a polyester diol (molecular weight 1700, based on adipic acid/hexanediol/neopentyl glycol, molar ratio of diols 65:35), 139.4 g of dimethylolpropionic acid, 49.1 g of hydroxypivalic acid, 19 g of 1,6-hexanediol and 93.8 g of trimethylolpropane were weight into a 10 liter reaction vessel having a stirrer, cooler and heating device. The mixture was dissolved in 1070 g of acetone and then reacted with 1389 g of 4,4'-dicyclohexylmethane diisocyanate at reflux temperature until the theoretical NCO content was obtained. 130 g of triethylamine and 4800 g of water were then added and the mixture was stirred at 50° C. until no more NCO groups were detected. 106 g of 2-amino-2-methyl-1-propanol were then added and the acetone was distilled off. A 42% dispersion 4) was obtained which had a pH value of 9.3. The total amount of neutralizing agent, based on the amount of carboxyl groups, was 170%. The acid number, based on resin solids, was approximately 22 mg of KOH/g. The content of isolated urea groups was 2.6%, based on resin solids.

Comparison Example 5

Example 1 was repeated with the exception that 80.5 g of triethylamine were added as the first portion of neutralizing agent and 72 g of triethylamine were added as the second portion of neutralizing agent. The amount of neutralizing agent, based on the amount of carboxyl groups incorporated, was 60% before dispersion and 112% in the finished dispersion. A 42% dispersion 5) was obtained which had a pH of 9.3.

Comparison Example 6

Example 1 was repeated with the exception that second amount of neutralizing agent was not added. A 42% dispersion 6) was obtained which had a pH of 7.5. The amount of neutralizing agent, based on the amount of carboxyl groups, was 89%.

Comparison Example 7

996 g of a polyester diol (molecular weight 2000, based on adipic acid/hexanediol/neopentyl glycol, molar ratio of diols 65:35), 996 g of a polycarbonate diol (molecular weight 2000, based on hexanediol/ε-caprolactone), 69 g of dimethylolpropionic acid (which corresponded to an amount of 2.25% of component D), based on resin solids), 54 g of butanediol and 46.8 g of trimethylolpropane were weighed into a 10 liter reaction vessel having a stirrer, cooler and heating device. The mixture was dissolved in 1464 g of acetone and then reacted with 877 g of isophorone diisocyanate until the theoretical NCO content was obtained. 46.2 g of triethylamine and 4131 g of distilled water were then added and the mixture was stirred at 50° C. until no more NCO groups were detected. 40.2 g of 2-amino-2-methyl-1-propanol were then added and the acetone was distilled off. A 42% dispersion 7) was obtained which had a pH of 9.4. The total amount of neutralizing agent, based on the amount of carboxyl groups, was 177%. The acid value, based on resin solids, was approximately 9 mg of KOH/g. The dispersion had very poor storage stability as evidence by the fact that it separated into phases after storage for several days at room temperature.

Comparison Example 8

900 g of a polyester diol (molecular weight 2000, based on adipic acid/hexanediol/neopentyl glycol, molar ratio of diols 65:35), 900 g of a polycarbonate diol (molecular weight 2000, based on hexanediol/ε-caprolactone), 279.6 g of dimethylolpropionic acid (which corresponded to an amount of 7.7% of component D), based on resin solids), 16.2 g of butanediol and 70.2 g of trimethylolpropane were weighed into a 20 liter reaction vessel having a stirrer, cooler and heating device. The mixture was dissolved in 1680 g of acetone and then reacted with 1315 g of isophorone diisocyanate until the theoretical NCO content was obtained. 187.2 g of triethylamine and 4540 g of distilled water were then added. A highly viscous dispersion was obtained, to which a further 7040 g of water were added in order to obtain the desired low viscosity. Stirring was then carried out at 50° C. until no more NCO groups were detected. 165 g of 2-amino-2-methyl-1-propanol were then added and the acetone was distilled off. A 22.5% dispersion 8) was obtained which had a pH of 9.6. The total amount of neutralizing agent, based on the amount of carboxyl groups, was 179%. The acid value, based on resin solids, was approximately 32 mg of KOH/g.

Storage stability of the dispersions

The storage stability of the dispersions was tested. Dispersions that did not exhibit phase separation and in which no sedimentation (formation of a deposit) was observed were described as "OK".

a) The dispersions were diluted with water (1:1 weight ratio) and stored at room temperature for one week:
dispersion 1) OK
dispersion 2) OK
dispersion 3) OK
dispersion 4) OK
dispersion 5) slight deposit
dispersion 6) deposit
dispersion 7) deposit, two phases
dispersion 8) OK b) Storage of the undiluted, original dispersion at 50° C. for one week:
dispersion 1) OK
dispersion 2) OK dispersion 3) OK
dispersion 4) OK
dispersion 5) slight deposit
dispersion 6) deposit
dispersion 7) heavy deposit, two phases
dispersion 8) OK Cleanability To test cleanability, the dispersions were applied to glass plates at a wet film thickness of 90 μm and dried for 40 minutes at 21° C./20% relative humidity. 2 ml of a cleaning solution (a mixture of 90% water, 9.2% butyl glycol and 0.8% dimethylethanolamine) were then dripped onto the glass plates, which were positioned at an angle. The dissolving behavior while the cleaning solution was being dripped onto the surface was evaluated; the glass surface after approximately 15 minutes was also evaluated.

Evaluation was carried out on the basis of the following criteria (1 to 5; 1=best value, 5=poorest value):

1: film dissolves immediately when cleaning solution was dripped onto the surface; no residue/film remained on the surface;
2: film dissolves slowly when cleaning solution was dripped onto the surface; virtually no residue/film remained on the surface;
3: only some of the film dissolves when cleaning solution was dripped onto the surface; residues or a thin film remained on the surface;
4: only some of the film dissolves when cleaning solution was dripped onto the surface; considerable residues remained on the surface;
5: film scarcely dissolves when cleaning solution was dripped onto the surface; only small amounts were removed.

dispersion 1) 1
dispersion 2) 2
dispersion 3) 1
dispersion 4) 1
dispersion 5) 5
dispersion 6) 3
dispersion 7) 3
dispersion 8) 1

Dispersions 1), 3) and 4) according to the invention exhibited good storage stability both in diluted form and undiluted, original form. They also exhibited very good cleanability. Despite a high content of carboxyl groups and neutralizing agent, and also high pH values and high molecular weights, the solids contents of the dispersions were greater than 40% while the viscosity was very low (<30 seconds efflux time, 23° C., DIN 4 beaker). This allows for economical preparation and varied applications in fields in which the typical high quality properties of polyurethane-urea dispersions (for example, hardness, elasticity, light and weather resistance, rapid drying and high layer strength) are required.

Comparison dispersions 2) and 8) exhibited good storage stability. However, due to their very low solids contents of 30% and 22.5%, respectively, they are both uneconomical to prepare and less well suited for many fields of application in which higher solids contents are advantageous. The low solids content very considerably limits the trouble free dry film strengths that can be achieved in coatings. The cleanability of comparison dispersion 2) was slightly poorer than it was for the dispersions according to the invention. The cleanability of comparison dispersion 8) was very good. However, due to the very high content of carboxyl groups and neutralizing agent, the water resistance of corresponding lacquers and coatings was limited.

Although comparison dispersions 5), 6) and 7) had high solids contents, their storage stability and cleanability were markedly poorer than the dispersions according to the invention.

Although the invention has been described in detail in the foregoing for the purpose of illustration, it was to be understood that such detail was solely for that purpose and that variations can be made therein by those skilled in the art without departing from the spirit and scope of the invention except as it may be limited by the claims.

What is claimed is:

1. An aqueous polyurethane-urea dispersion having a resin solids content of at least 35 wt. % and a pH of at least 7.5 which is prepared by
   a) forming an isocyanate-terminated prepolymer by reacting
      A) a difunctional polyol having a number average molecular weight of 500 to 6000,
      B) an at least difunctional low molecular weight alcohol having a number average molecular weight of less than 500,
      C) a diisocyanate and/or triisocyanate, and
      D) a compound which has an acid group and one or two isocyanate-reactive groups comprising a member selected from the group consisting of hydroxy, primary amino and secondary amino groups, and which is present in an amount sufficient to provide an acid number, based on resin solids, of 12 to 27 mg of KOH/g,
   b) neutralizing 65% to 95% of the acid groups of component D) prior to dispersing the prepolymer in water,
   c) dispersing the neutralized prepolymer in water,
   d) chain extending the isocyanate groups with water to form a polyurethane-urea, and
   e) after completion of the chain extending reaction adding additional neutralizing agent to provide a total amount of neutralizing agent that is sufficient to neutralize at least 115% of the acid groups of component D), wherein the polyurethane-urea contains 1.0 to 4.0%, based on resin solids, of the isolated urea groups shown in square brackets in formula (I)

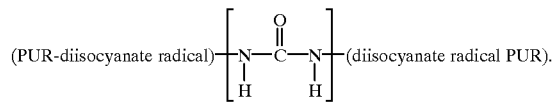

2. The aqueous polyurethane-urea dispersion of claim 1 wherein the isocyanate-terminated prepolymer is prepared by reacting
   A) 45 to 75 wt. % of an at least difunctional polyol having a number average molecular weight of 500 to 6000,
   B) 1 to 6 wt. % of an at least difunctional alcohol having a number average molecular weight of <350,
   C) 20 to 45 wt. % of a diisocyanate and/or triisocyanate,
   D) 3 to 7 wt. % of dimethylolpropionic acid, dimethylolbutyric acid and/or hydroxypivalic acid, and
   E) 0 to 5 wt. % of a non-ionic/hydrophilic, monofunctional polyethylene glycol monoalkyl ethers having a number average molecular weight of 350 to 2500.

3. The aqueous polyurethane-urea dispersion of claim 1 which has a pH of at least 8.5, an acid number of 15 to 25 mg of KOH/g, and a resin solids content of at least 40%, and is prepared by a) forming an isocyanate-terminated prepolymer by reacting
   A) 50 to 70 wt. % of a difunctional polyester and/or polycarbonate having a number average molecular weight of 840 to 2600,
   B) 1 to 4 wt. % of a mixture of a difunctional and a trifunctional alcohol having a number average molecular weight of <210,
   C) 25 to 40 wt. % of isophorone diisocyanate, hexamethylene diisocyanate and/or 4,4-diisocyanatodicyclohexylmethane and
   D) 4 to 6 wt. % of dimethylolpropionic acid and/or hydroxypivalic acid,
b) neutralizing 75% to 95% of the acid groups of component D) prior to dispersing the prepolymer in water,
c) dispersing the neutralized prepolymer in water,
d) chain extending the isocyanate groups with water to form a polyurethane-urea, and
e) after completion of the chain extending reaction adding additional neutralizing agent to provide a total amount of neutralizing agent that is sufficient to neutralize >150% of the acid groups of component D),
wherein the polyurethane-urea contains 1.75 to 3.25%, based on resin solids, of the isolated urea groups shown in square brackets in formula (I).

4. The aqueous polyurethane-urea dispersion of claim 1 which is solvent free and wherein the total amount of neutralizing agent is sufficient to neutralize >165% of the acid groups of component D).

5. The aqueous polyurethane-urea dispersion of claim 2 which is solvent free and wherein the total amount of neutralizing agent is sufficient to neutralize >165% of the acid groups of component D).

6. The aqueous polyurethane-urea dispersion of claim 3 which is solvent free and wherein the total amount of neutralizing agent is sufficient to neutralize >165% of the acid groups of component D).

7. The aqueous polyurethane-urea dispersion of claim 1 wherein at least 50% of component C) is 1-methyl-2,4(2,6)-diisocyanato-cyclohexane.

8. A process for preparing an aqueous polyurethane-urea dispersion having a resin solids content of at least 35 wt. % and a pH of at least 7.5 which comprises
a) forming an isocyanate-terminated prepolymer by reacting
   A) a difunctional polyol having a number average molecular weight of 500 to 6000,
   B) an at least difunctional low molecular weight alcohol having a number average molecular weight of less than 500,
   C) a diisocyanate and/or triisocyanate, and
   D) a compound which has an acid group and one or two isocyanate-reactive groups comprising a member selected from the group consisting of hydroxy, primary amino and secondary amino groups, and which is present in an amount sufficient to provide an acid number, based on resin solids, of 12 to 27 mg of KOH/g,
b) neutralizing 65% to 95% of the acid groups of component D) prior to dispersing the prepolymer in water,
c) dispersing the neutralized prepolymer in water,
d) chain extending the isocyanate groups with water to form a polyurethane-urea, and
e) after completion of the chain extending reaction adding additional neutralizing agent to provide a total amount of neutralizing agent that is sufficient to neutralize at least 115% of the acid groups of component D), wherein the polyurethane-urea contains 1.0 to 4.0%, based on resin solids, of the isolated urea groups shown in square brackets in formula (I)

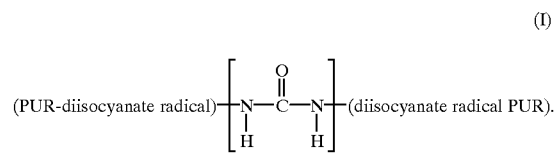

9. The process of claim 8 wherein the isocyanate-terminated prepolymer is prepared by reacting
   A) 45 to 75 wt. % of an at least difunctional polyol having a number average molecular weight of 500 to 6000,
   B) 1 to 6 wt. % of an at least difunctional alcohol having a number average molecular weight of <350,
   C) 20 to 45 wt. % of a diisocyanate and/or triisocyanate,
   D) 3 to 7 wt. % of dimethylolpropionic acid, dimethylolbutyric acid and/or hydroxypivalic acid, and
   E) 0 to 5 wt. % of a non-ionic/hydrophilic, monofunctional polyethylene glycol monoalkyl ethers having a number average molecular weight of 350 to 2500.

10. The process of claim 8 wherein the aqueous polyurethane-urea dispersion is solvent free and has a pH of at least 8.5 and a resin solids content of at least 40%, which comprises
a) forming an isocyanate-terminated prepolymer in a 50 to 80% organic solution by reacting at an NCO:OH equivalent ratio of 1.25:1 to 2.2:1
   A) 50 to 70 wt. % of a difunctional polyester and/or polycarbonate having a number average molecular weight of 840 to 2600,
   B) 1 to 4 wt. % of a mixture of a difunctional and a trifunctional alcohol having a number average molecular weight of <210,
   C) 25 to 40 wt. % of isophorone diisocyanate, hexamethylene diisocyanate, 4,4-diisocyanatodicyclohexylmethane, 1-methyl-2,4- and/or -2,6-diisocyanatocyclohexane or mixtures thereof,
   D) 4 to 6 wt. % of dimethylolpropionic acid and/or hydroxypivalic acid,
b) neutralizing 75% to 95% of the acid groups of component D) prior to dispersing the prepolymer in water,
c) dispersing the neutralized prepolymer in water,
d) chain extending the isocyanate groups solely with water and without the addition of amino- and/or hydroxy-functional chain extending agents to form a polyurethane-urea,
e) after completion of the chain extending reaction adding additional neutralizing agent to provide a total amount of neutralizing agent that is sufficient to neutralize >150% of the acid groups of component D), and
f) removing the solvent by distillation.
wherein the polyurethane-urea contains 1.75 to 3.25%, based on resin solids, of the isolated urea groups shown in square brackets in formula (I).

11. A coating composition containing the aqueous polyurethane-urea dispersion of claim 1.

* * * * *